Sept. 13, 1960  F. H. LEGGE  2,952,473
COMBINED WHEEL SUSPENSION AND LEVELING JACK ASSEMBLY
Filed July 28, 1958  3 Sheets-Sheet 1
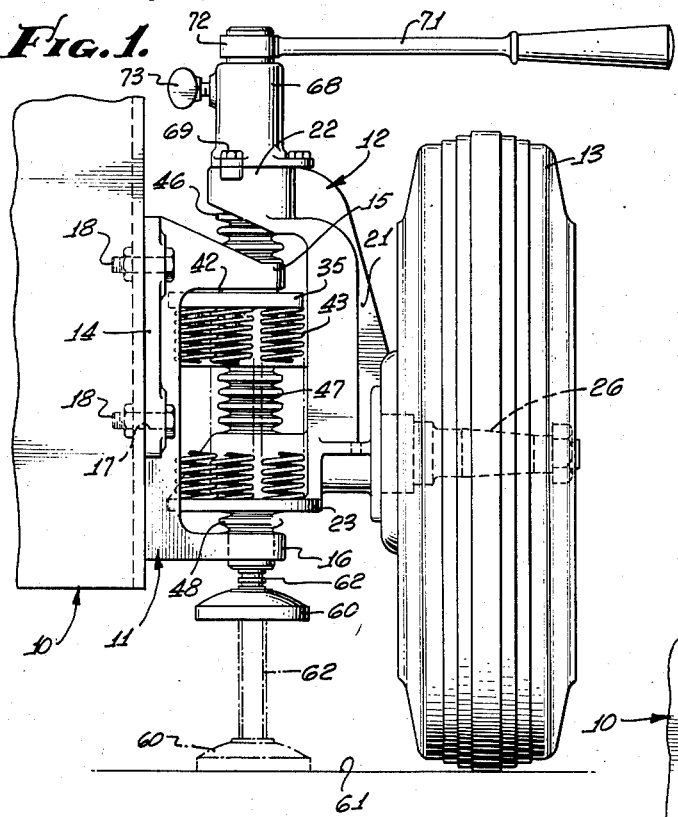
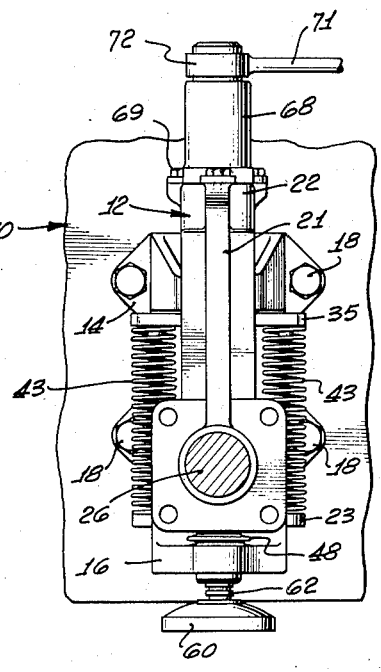
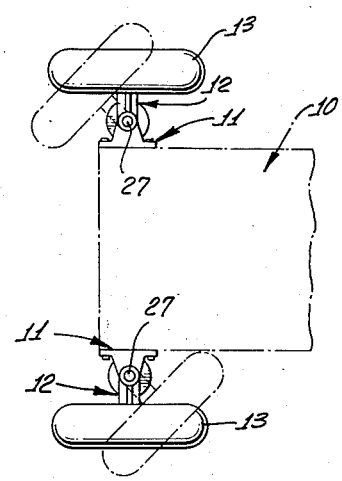
FREDERICK H. LEGGE,
INVENTOR.
BY
ATTORNEYS.

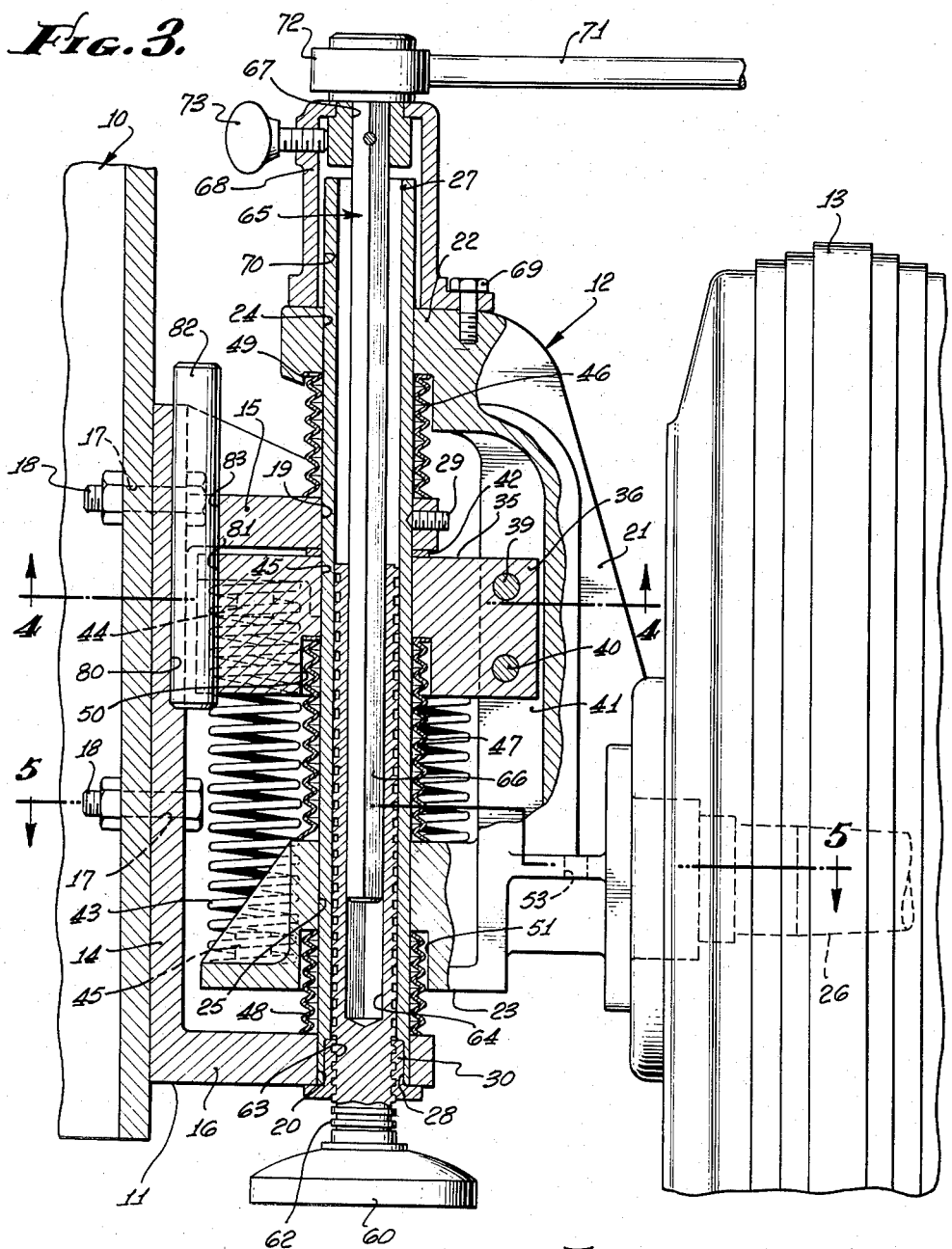

Sept. 13, 1960      F. H. LEGGE      2,952,473
COMBINED WHEEL SUSPENSION AND LEVELING JACK ASSEMBLY
Filed July 28, 1958      3 Sheets-Sheet 3
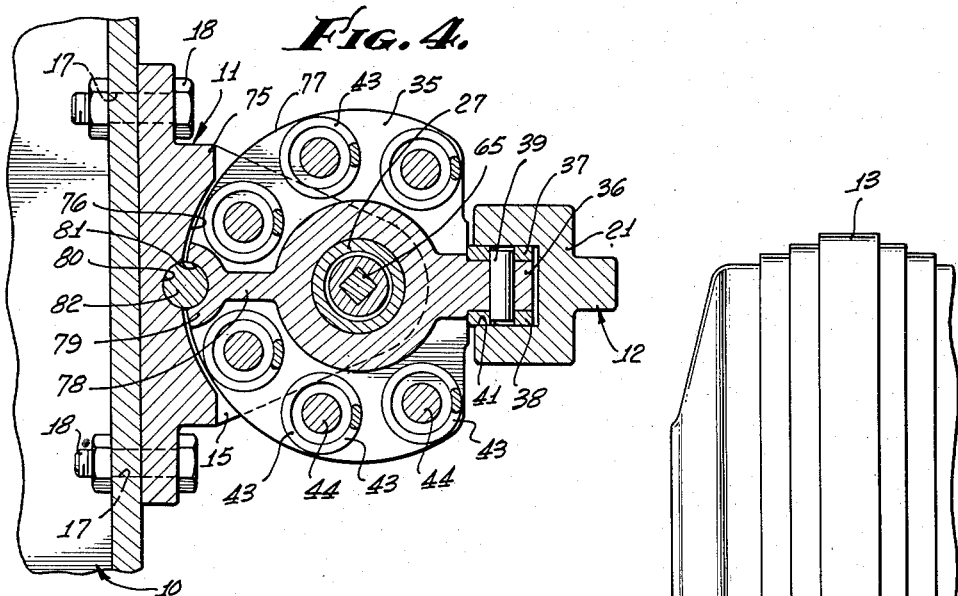
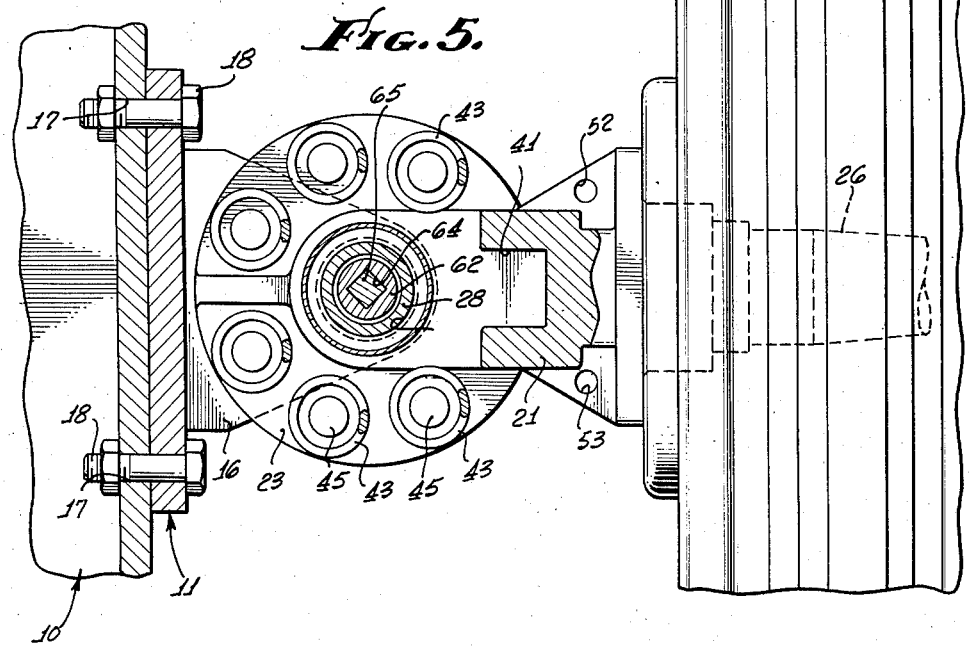
FREDERICK H. LEGGE,
INVENTOR.
BY Beeler & Shanahan
ATTORNEYS.

United States Patent Office 2,952,473
Patented Sept. 13, 1960

2,952,473
COMBINED WHEEL SUSPENSION AND LEVELING JACK ASSEMBLY

Frederick H. Legge, La Crescenta, Calif., assignor to Aerol Co., Inc., Los Angeles, Calif., a corporation of California Filed July 28, 1958, Ser. No. 751,363
8 Claims. (Cl. 280—96.2)

The invention relates to wheel mountings for sundry types of carriages and dollies and has particular reference to a wheel mount which is shock-absorbing and which is of sufficiently versatile character to be capable of application to a great variety of different types of dollies, carriages, carts, and the like, the shock mount being of such character that a single mount can be used for either front or rear wheels on either side of the vehicle. The shock mount wheel assembly herein made reference to is of such character that it is adapted to provide a relatively great amount of clearance between the mount and the surface over which the vehicle is adapted to be transported.

Equipment of various kinds made use of in industry as well as in the Armed Services is of such character that though often very heavy and cumbersome, nevertheless needs to be moved about occasionally to new placements. Many pieces of equipment of the kind made reference to is such that it cannot handily be placed upon a trailer or other movable chassis on those occasions where it might need to be moved. The type of use of many pieces of equipment of this sort is further such that when transportation is needed, the ground surfaces and locations where the equipment might need to be moved present obstacles which are not encountered on relatively level roadways and flat areas. Moreover, the type of equipment included in the pieces may at times be of a sufficiently delicate or fragile character that it could become damaged if not handled with reasonable care over rough terrain.

It is accordingly among the objects of the invention to provide a new and improved shock mount for wheel assemblies which is of rugged character, shock absorbing to a substantial degree, and which is sufficiently versatile with respect to its structure that it can be successfully mounted in operating condition on a great variety of chassis and dollies.

Another object of the invention is to provide a new and improved shock mount for wheel assemblies which is so constructed as to provide a virtually maximum amount of ground clearance while at the same time is of a character permitting easy installation upon a selected vehicle or demounting therefrom and which is sufficiently simple and rugged to permit of easy maintenance in the field.

Still another object of the invention is to provide a new and improved shock mount which is of such design and construction that parts of the device providing the cushioning shock-absorbing qualities can be readily interchanged where different loads are encountered without any material disassembly of remaining parts of the device so that the same framework can be used for a great variety of loads under circumstances where a quick change in the field is possible to accommodate different conditions.

Still another object of the invention is to provide a new and improved versatile type of shock mount for wheel assemblies which is of such character that it can be used either for wheels which need to be controlled by a steering mechanism or wheels which need to be fixed as they would frequently be when used as rear wheels of vehicles, the change being made possible by a simple converting device which needs no material change in the construction or operation of the assembly as a whole.

Also included among the objects of the invention is to provide a new and improved shock mount for wheel assemblies which can be either pivoted as a steering wheel or fixed on other occasions and which includes a levelling jack or levelling brake incorporated in the device which may be employed to level the chassis upon which the wheel mount is attached where the supporting surface is rough and uneven, the levelling being accomplished by simple means operable independently of the shock absorbing and rotating features regardless of the attitude of the wheel on the mount.

Also included among the objects of the invention is a new and improved shock absorbing means or cushioning device incorporated in the mount which operates in a positive simple fashion and of such construction that the moving parts can be adequately shielded and protected against dirt which might otherwise impair the effectiveness of the operation.

With these and other objects in view, the invention consists in the construction, arrangement and combination of the various parts of the device whereby the objects contemplated are attained as hereinafter set forth, pointed out in the appended claims and illustrated in the accompanying drawings.

In the drawings:

Figure 1 is an elevational view of the shock mount showing the relative position of attachment to a dolly or carriage and showing a wheel in place upon the mount.

Figure 2 is an elevational view at right angles to the view illustrated in Figure 1 with the wheel removed and showing the wheel axle in cross-section.

Figure 3 is a vertical sectional view of the mount shown in Figure 1.

Figure 4 is a cross-sectional view taken on the line 4—4 of Figure 3.

Figure 5 is a cross-sectional view taken on the line 5—5 of Figure 3.

Figure 6 is a diagrammatic view showing the shock mount employed to support steerable wheels on a chassis.

In an embodiment of the invention chosen for the purpose of illustration there is shown a vehicle 10 which may be in practice a dolly, a chassis, or a frame or casing for some item of equipment which needs to be mobile. Fastened to each of four corners preferably of the vehicle is a support bracket 11 which may be identical for each location and to which is attached a knuckle bracket indicated generally by the reference character 12 adapted to mount a wheel 13. The knuckle bracket is adapted to pivot with respect to the support bracket and to be cushioned with respect to the support bracket so that as the wheels travel over a supporting surface, shocks imparted to the wheels when striking unevenness and obstacles are damped before reaching the vehicle.

More particularly the support bracket consists of a base 14 from which extend an upper arm 15 and a lower arm 16. The base is provided with suitable bolt holes 17 receptive of bolts 18 by means of which the support bracket is anchored to the vehicle. A passage 19 in the upper arm is in axial alignment with a passage 20 in the lower arm, the alignment being in a vertical direction.

The knuckle bracket consists of an axle mount 21 at the upper end of which is an upper carrier 22 and at the lower end of which is a lower carrier 23. In the upper carrier is a passage 24 in axial alignment with a passage 25 in the lower carrier, these passages being capable of axial alignment with the previously identified passages 19 and 20. A stub shaft or axle 26 extends in a direction substantially horizontal and is adapted to support the somewhat conventional wheel 13 which, if occasion require, may be supplied with brakes of the customary kind.

In order to secure the knuckle bracket pivotally with respect to the support bracket, there is provided a king pin means embodied in a hollow shaft 27 extending from the upper carrier 22 through the arms 15 and 16 and the lower carrier 23.

The hollow shaft 27 is received within and extends upwardly beyond the passage 24 in the upper carrier 22 and extends downwardly through the passage 19 in the upper arm 15 to a location substantially below the upper arm. A set screw 29 anchors the hollow shaft in the upper arm 15. The shaft 27 has a counter bore 28 for a nut 30 and extends from the lower arm upwardly through the passage 25 in the lower carrier 23, wherein the hollow shaft has a freely pivoting connection.

Assembled with the knuckle bracket is a plate 35 which may be described as a spring retaining plate. A boss 36 extends radially outwardly from the plate, as seen to good advantage in Figures 3 and 4, and has mounted on opposite vertical faces slide plates 37 and 38, these being secured by pins 39 and 40. The boss 36 and plates 37 and 38 are constructed and mounted so as to be slidably received within a slideway 41 within the axle mount 21. This permits a free sliding movement in a vertical direction of the axle mount with respect to the plate 35.

A bearing washer or plate 42 is located between the upper face of the plate 35 and the lower face of the upper arm 15, as clearly shown in Figure 3. To hold the lower carrier 23 spaced from the plate 35, there is provided a series of coiled springs 43, six in number in the chosen embodiment, these being positioned between the under face of the plate 35 and the upper face of the lower carrier 23. Spring keepers 44 on the plate 35 and 45 on the lower carrier 23 serve to locate and retain the springs in proper position. It will be noted that the springs are evenly spaced one from another in a circumferential direction about the axis of the king pin means.

The plate 35 has a passage 45 therethrough which is in axial alignment with the passages 19, 20, 24 and 25 and is rotatably received by the lower end of the hollow shaft 24 about which it is free to pivot. Inasmuch as the plate 35 is secured to the knuckle bracket and rotates with the knuckle bracket, it will be understood that the knuckle bracket including the upper carrier 24, the lower carrier 23, and the plate 35 is enabled to pivot freely about the king pin means with relation to the support bracket 11. The springs 43 retained as described pivot as a unit with the knuckle bracket.

In order to keep the moving parts clean and free of dust and dirt flexible covers 46, 47 and 48 are employed. The cover 46 fits within a recess 49 in the upper carrier 22 and by reason of surrounding the hollow shaft 24 and extending into engagement with the upper face of the upper arm 15 protects the rotating connection of the hollow shaft with the upper arm. Similarly a recess 50 in the plate 35 receives the upper end of the cover 47, the cover extending downwardly into engagement with an upper face of the lower carrier 43 at that portion of the carrier where it surrounds the passage 25. In the lower carrier 23 is a recess 51 which receives the upper end of the cover 48, the lower end of the cover extending downwardly into engagement with an upper face of the lower arm 16, thereby protecting the rotating connection between the hollow shaft 28 and the passage 20.

On those occasions where the knuckle bracket is to be used in a steering assembly, use may be made of appropriate tie rod fittings receivable in apertures 52 and 53 and faced in one direction or the other, depending upon whether the shock mount is being used as a right-hand or left-hand wheel support.

On those occasions where the vehicle needs to be anchored or braked upon the supporting surface or leveled with respect to a surface which is other than level, a leveling jack or leveling brake may be manipulated. The leveling brake in the embodiment shown consists of a brake shoe 60 which when need be can be extended downwardly into engagement with the supporting surface 61, as illustrated in broken lines in Figure 1. To mount and manipulate the brake shoe there is provided a shaft 62 threaded on the exterior and which is threadedly received in and engaged by thread 63 in the nut 30 which is held by a press fit within the counter bore 28 of the hollow shaft 27.

A brake rod 65 has a square section 66 which extends slidably into a square aperture 64 and in non-rotatable relationship to the shaft 62. The rod 65 is rotatably received in the interior of the hollow shaft 27 and extends upwardly through a hole 67 in a cap 68. The cap in turn is secured to the upper face of the upper carrier 22 by screws 69. It will be noted that the cap has a recess 70 therein which receives the upper end of the hollow shaft 27. A brake adjusting arm 71 is attached to the brake rod 65 by means of a substantially conventional ratchet connection 72. When need be, a thumb screw 73 may be used to tighten the brake rod 65 in either a retracted position, as illustrated in the solid lines of Figure 1, or a leveling or braking position, as illustrated by the broken lines.

The device as described heretofore is particularly well adapted to a front wheel mounting wherein the wheels can be steered. On those occasions where precisely the same device may need to be used as rear wheels for a vehicle, the axle on the knuckle bracket must be in fixed position with respect to the supporting bracket and the vehicle, assuming that the front wheels are used for steering the vehicle about, rather than in a push type installation.

To anchor the knuckle bracket against rotation, the supporting bracket is provided with a flange or projection 75 in which is formed an arcuate recess 76. The arcuate recess 76 is complementary in form to an arcuate perimeter 77 of the plate 35. On the plate 35 is a stiffening rib 78 having an enlargement 79 which in the chosen embodiment is diametrically opposite the boss 36 previously described. Within the flange 75 is an arcuate notch 80 which is complementary to an arcuate notch 81 in the enlargement 79. When these notches are aligned a peg 82 can be inserted into them as shown in Figures 3 and 4. A suitable hole 83 is provided in the upper arm 50 so that the peg 82 may be extended downwardly from above into the notches. By this means rotation or pivoting of the knuckle bracket can be inhibited at a location such that the axle 26 may serve as a rear wheel axle. When serving as a rear wheel axle, however, the shock absorbing spring assembly continues to act effectively and the leveling jack or brake is also free to be operated at will.

From the foregoing description it will be readily understood that by reason of the simple open construction of the assembly parts may be removed and replaced without it being necessary to substantially disassemble those portions of the device which do not need replacement. Either of the hollow shafts can be removed and replaced if worn. Moreover, the springs 43 can readily be lifted clear of the respective keepers and removed and be replaced by either heavier springs or lighter springs, whichever may be best suited to the new load which will be encountered in the vehicle.

Further, if need be, the wearing portions of the plate 35, or the plate 35 itself, may be handily removed and replaced as well as the wear plates 37; those portions of the device constituting the leveling jack or leveling brake being structurally separable from the remaining portions can likewise be readily serviced without any of the remaining portions of the assembly needing to be temporarily removed. Moreover, by reason of the compact in-line arrangement of the moving parts, those few moving parts which are needed are adequately protected by the covers in the manner described so that when the apparatus is in use, it will be protected to a relatively maximum degree, thereby assuring long service without frequent servicing. The parts are furthermore sufficiently interchangeable so that should any one of four shock mounts be damaged, it can be readily replaced by another mount of precisely the same kind.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A shock mount for supporting a carriage comprising a support bracket having a base and upper and lower vertically spaced arms thereon, said support bracket being adapted for attachment to the carriage, a knuckle bracket for a wheel, said knuckle bracket comprising a body and upper and lower vertically spaced carriers on the body, means forming a series of axially aligned passages respectively in said arms and said carriers, and king pin means extending through said passages swivelly securing said knuckle bracket to said support bracket, said king pin means comprising a shaft protruding into said upper carrier and below said upper arm, and means anchoring said shaft against vertical movement, a spring retaining plate having a vertically slidable mounting on said knuckle bracket, said plate having a bearing against said support bracket and having an opening receptive of said shaft whereby to pivot about said shaft, and shock absorbing spring means extending between said plate and said knuckle bracket whereby to yieldably resist elevation of said knuckle bracket relative to said support bracket and said plate.

2. A shock mount for supporting a carriage comprising a support bracket having a base and upper and lower vertically spaced arms thereon, said support bracket being adapted for attachment to the carriage, a knuckle bracket comprising an axle mount and upper and lower vertically spaced carriers on the axle mount, means forming a series of axially aligned passages respectively in said arms and said carriers, and king pin means extending through said passages swivelly securing said knuckle bracket to said support bracket, said king pin means comprising a shaft protruding into one of said carriers and below the arm on the lower side of said last identified carrier, and means anchoring said shaft to one of said arms, a spring retaining plate having a vertically slidable mounting on said axle mount, said plate having a bearing against said last identified arm and having an opening receptive of said hollow shaft whereby to pivot about said shaft, and shock absorbing spring means located upon said plate and between said plate and the next lower carrier whereby to yieldably resist elevation of said knuckle bracket relative to said support bracket and said plate.

3. Shock mounts for supporting a carriage by use of sets of forward and rear wheels mounted thereon, each said mount comprising a support bracket having a base and upper and lower spaced parallel arms thereon, said support bracket being adapted for attachment to the carriage, a knuckle bracket having a horizontal wheel axle thereon, said knuckle bracket comprising an axle mount and upper and lower spaced parallel carriers on the axle mount, means forming a series of axially aligned passages respectively in said arms and said carriers, and king pin means extending through said passages swivelly securing said knuckle bracket to said support bracket, said king pin means comprising a hollow shaft protruding above said upper carrier and below said upper arm, and means anchoring said shaft to said upper arm, a spring retaining plate having a vertically slidable mounting on said axle mount, said plate being nonrotatable with respect to the knuckle bracket, said plate having a bearing against said upper arm and having an opening receptive of said hollow shaft whereby to pivot about said shaft, and a series of shock absorbing springs located circumferentially about said plate and extending between said plate and said lower carrier whereby to yieldably resist elevation of said knuckle bracket relative to said support bracket and said plate.

4. A shock mount for supporting a carriage on a wheel comprising a support bracket having a base and upper and lower vertically spaced arms thereon, said bracket being adapted for attachment to the carriage, a knuckle bracket comprising an axle mount and upper and lower vertically spaced carriers on the axle mount, means forming a series of axially aligned passages respectively in said arms and said carriers, and king pin means extending through said passages swivelly securing said knuckle bracket to said support bracket, said king pin means comprising hollow shafting protruding into said upper carrier and below said lower arm and means anchoring said king pin means against vertical movement, a spring retaining plate pivotally mounted around said king pin means and spring means between said plate and said lower carrier whereby to yieldably resist elevation of said knuckle bracket, and a leveling device comprising a shoe adapted to engage the ground, an exteriorly threaded shoe rod threadedly received in said king pin means, a leveling rod extending downwardly, one of said rods being hollow and having a threaded engagement within said king pin means, the other of said rods being non-rotatably and slidably received within the hollow rod, and a leveling arm secured to the upper end of said leveling rod, said leveling arm being adapted to be rotated whereby to move said shoe vertically between set and unset positions.

5. Shock mounts for supporting a carriage on sets of forward and rear wheels, each mount comprising a support bracket having a base and upper and lower spaced parallel arms thereon, said bracket being adapted for attachment to the carriage, a knuckle bracket having a horizontal wheel axle thereon, said knuckle bracket comprising an axle mount and upper and lower spaced parallel carriers on the axle mount, means forming a series of axially aligned passages respectively in said arms and said carriers, and king pin means extending through said passages swivelly securing said knuckle bracket to said support bracket, said king pin means comprising a hollow shaft protruding above said upper carrier and below said upper arm and a cap on said upper carrier having a recess therein receptive of the upper end of said hollow shaft, said hollow shaft having a lower end anchored to said lower arm and pivotally retained in said lower carrier, a spring retaining plate pivotally mounted around said king pin means and springs between said plate and said lower carrier whereby to yieldably resist elevation of said knuckle bracket, and a leveling device comprising a shoe adapted to engage the ground, an exteriorly threaded shaft threadedly received in said king pin means, said threaded shaft having a non-circular aperture therein, a leveling rod extending from said cap downwardly through said king pin means and having a lower end non-rotatably and axially slidably received in said aperture, and a leveling arm secured to the upper end of said rod, said leveling arm being adapted to be rotated whereby to rotate said rod and move said shoe vertically between set and unset positions.

6. A shock mount for supporting a carriage comprising a support bracket having a base and upper and lower vertically spaced arms thereon, said bracket being adapted for attachment to the carriage, a knuckle bracket comprising an axle mount and upper and lower vertically spaced carriers on the axle mount, means forming a series of axially aligned passages respectively in said arms and said carriers, and king pin means extending through said passages swivelly securing said knuckle bracket to said support bracket, a spring retaining plate having a vertically slidable mounting on said knuckle bracket, said plate having a bearing against said support bracket and having an opening receptive of said shaft whereby to pivot about said shaft, and shock absorbing spring means extending between said plate and said knuckle bracket whereby to yieldably resist elevation of said knuckle bracket relative to said support bracket and said plate, and a converting device for converting said knuckle bracket from a pivotal steering bracket to a fixed bracket comprising means forming an arcuate recess in a section of said support bracket, a complementary arcuate disc element on said knuckle bracket plate located in said arcuate recess, means forming complementary notches respectively in said section and said disc element in alignment when said axle mount is in a position normal to said carriage, and a peg removably receivable in said notches whereby to anchor the knuckle bracket against pivoting.

7. A shock mount for supporting a carriage comprising a support bracket having a base and upper and lower vertically spaced arms thereon, said bracket being adapted for attachment to the carriage, a knuckle bracket comprising an axle mount and upper and lower vertically spaced carriers on the axle mount, means forming a series of axially aligned passages respectively in said arms and said carriers, and king pin means extending through said passages swivelly securing said knuckle bracket to said support bracket, a spring retaining plate having a vertically slidable mounting on said axle mount, said plate having a bearing against said upper arm and having an opening receptive of said hollow shaft whereby to pivot about said shaft, and a series of shock absorbing springs located about said plate and extending between said plate and said knuckle bracket whereby to yieldably resist elevation of said knuckle bracket relative to said support bracket and said plate, and a converting device for converting said knuckle bracket from a pivotal steering bracket to a fixed bracket comprising means forming an arcuate recess in a section of said support bracket, a complementary arcuate disc element on said plate located in said arcuate recess, means forming complementary notches respectively in said section and said disc element in alignment when said axle mount is in a position normal to said carriage, and a peg removably receivable in said notches whereby to anchor the knuckle bracket against pivoting.

8. Shock mounts for supporting a carriage on sets of forward and rear wheels, each said mount comprising a support bracket having a base and upper and lower vertically spaced arms thereon, said bracket being adapted for attachment to the carriage, a knuckle bracket comprising an axle mount and upper and lower vertically spaced carriers on the axle mount, means forming a series of axially aligned passages respectively in said arms and said carriers, and king pin means extending through said passages swivelly securing said knuckle bracket to said support bracket, a spring retaining plate having a vertically slidable mounting on said axle mount, said plate having a bearing against said upper arm and having an opening receptive of said king pin means whereby to pivot about said king pin means, and a series of shock absorbing springs between said plate and said lower carrier whereby to yieldably resist elevation of said knuckle bracket relative to said support bracket and said plate, and a converting device for converting said knuckle bracket from a pivotal steering bracket to a fixed bracket comprising means forming an arcuate recess in a section of said upper arm, a complementary arcuate disc element on said plate located in said arcuate recess, a diametrically extending rib on said plate having a thick portion adjacent the perimeter of said disc element, means forming complementary notches respectively in said section and said disc element in alignment when said axle mount is in a position normal to said carriage, and a peg removably receivable in said notches whereby to anchor the knuckle bracket against pivoting.

References Cited in the file of this patent

UNITED STATES PATENTS

| | | |
|---|---|---|
| 1,058,600 | Kiltz | Apr. 8, 1913 |
| 1,108,522 | Searles et al. | Aug. 25, 1914 |
| 1,113,202 | Davis | Oct. 13, 1914 |
| 2,563,370 | Reese | Aug. 7, 1951 |